United States Patent [19]
Blasi

[11] Patent Number: 5,333,170
[45] Date of Patent: Jul. 26, 1994

[54] AUTOMATIC OPENING DEVICE FOR THE WINDOW OF A RADIOGRAPHIC CASSETTE

[75] Inventor: Riccardo Blasi, Rome, Italy

[73] Assignee: Metaltronica S.r.L., Rome, Italy

[21] Appl. No.: 916,634

[22] Filed: Jul. 22, 1992

[30] Foreign Application Priority Data

Jul. 22, 1991 [IT] Italy .............................. 91-A/000551

[51] Int. Cl.⁵ .............................................. H05G 1/28
[52] U.S. Cl. ..................................... 378/166; 378/165
[58] Field of Search .................................. 378/165, 166

[56] References Cited

U.S. PATENT DOCUMENTS 3,614,917 10/1971 Wenthe et al. .
3,628,864 12/1971 Fessenden et al. .................. 378/166

OTHER PUBLICATIONS

Patent Abstracts of Japan, vol. 12, No. 456, Nov. 1988 and Jul. 1988.

Primary Examiner—Craig E. Church
Attorney, Agent, or Firm—Pollock, Vande Sande & Priddy

[57] ABSTRACT

An automatic opening device for the window of a radiographic cassette including a fixed bracket (1); motor-driven equipment (8) sliding along the bracket (1) between a position of engagement with the window and a position of full opening of the window, including a cap element (12) sliding vertically between positions of engagement and disengagement with the window and equipped with a spring (15) which is compressed when the cap element (12) is in the disengagement position as to the window, at least one movable side (10) sliding on the fixed brakcet (1), and trailing with it the cap element (12), and a wedge element (11) causing the cap element (12) to move vertically.

3 Claims, 3 Drawing Sheets

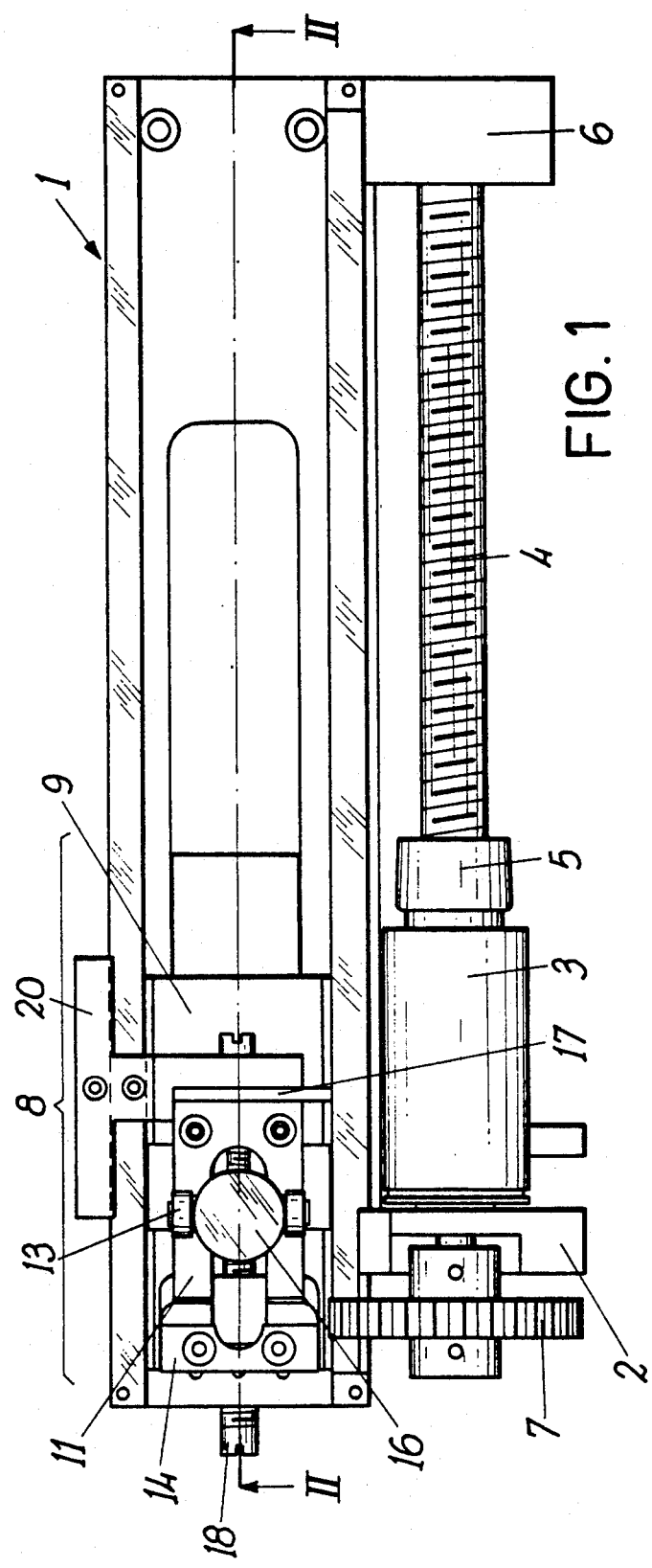
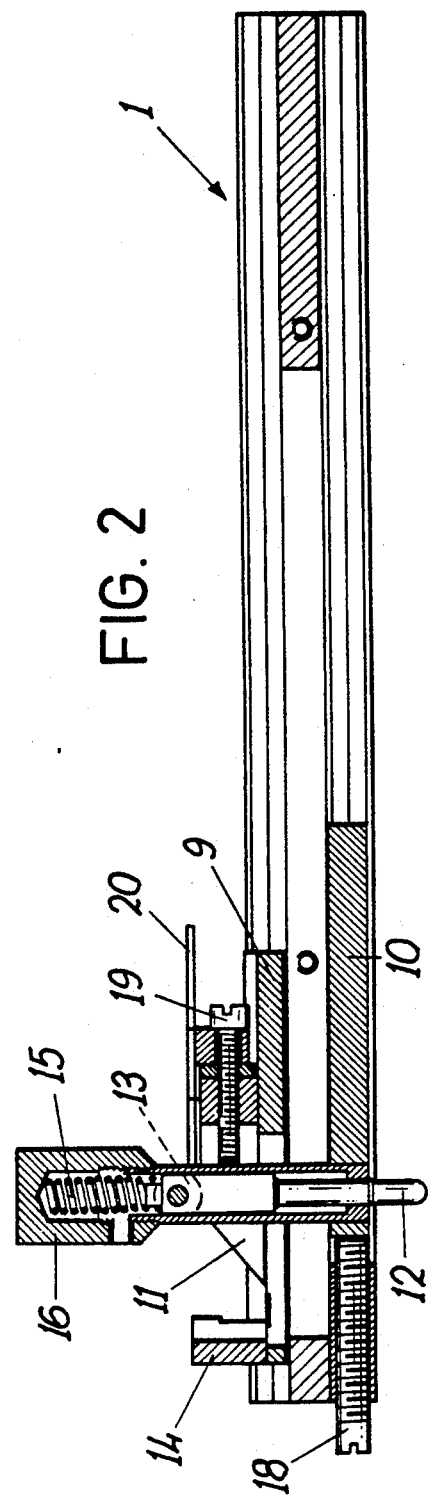
FIG. 1
FIG. 2

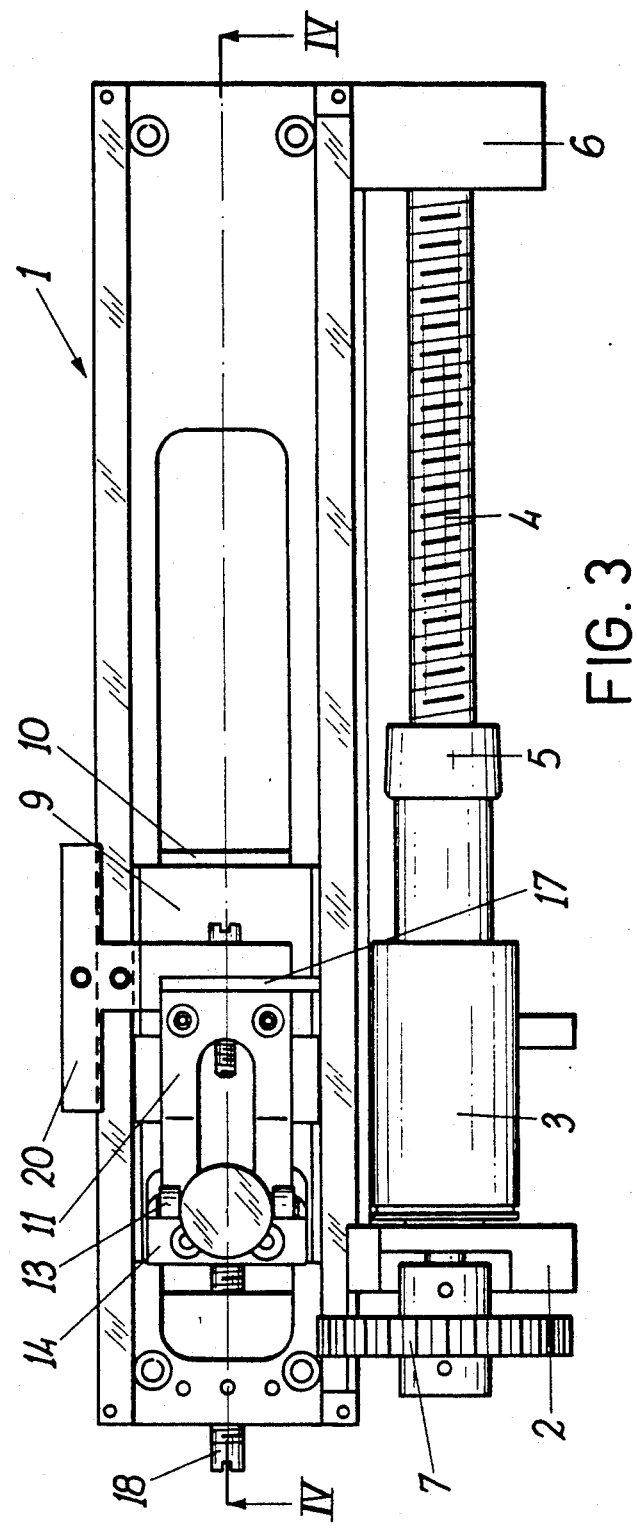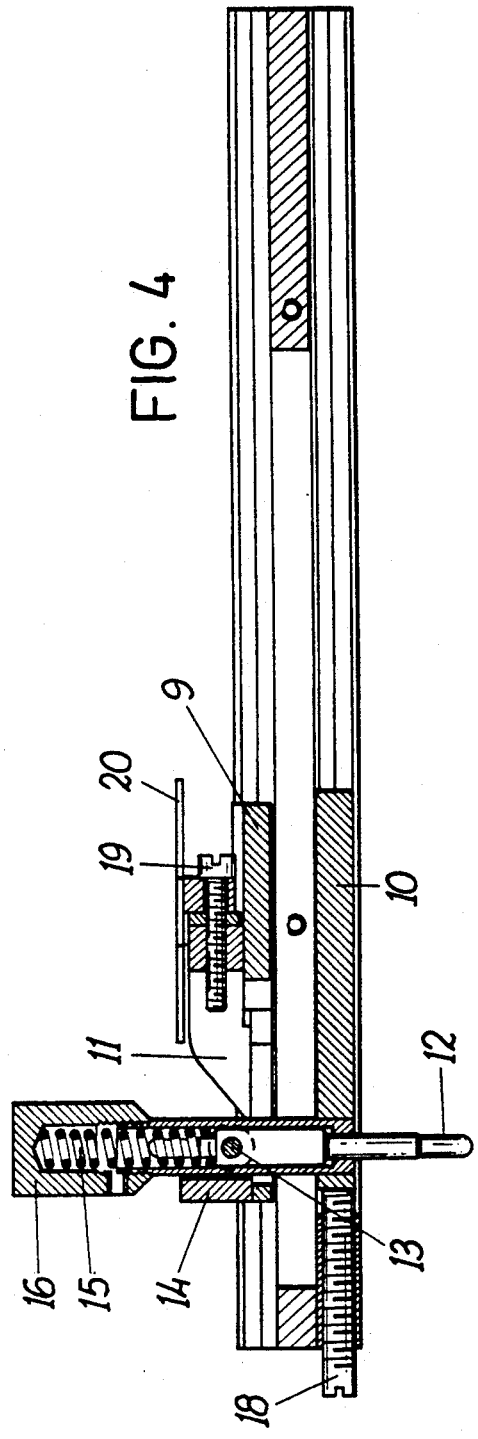

AUTOMATIC OPENING DEVICE FOR THE WINDOW OF A RADIOGRAPHIC CASSETTE

FIELD OF THE INVENTION

The present invention concerns a device for the automatic opening of the window of a radiographic cassette.

More particularly, the invention concerns a device of the above-mentioned type, as used in equipment to print data relating to a patient and his examination on radiographic film, that permits the window of the radiographic cassette to be opened so as to allow the data relevant to the patient to be printed directly on the film by means of a device on the appliance.

BACKGROUND OF THE INVENTION

At present, to be able to "customize" the plates to avoid all confusion, identifying them both according to the patient and according to the type of radiography carried out, completely manual systems are generally adopted, e.g., by identifying the plates by lead letters, before performing the radiography or by typing the data on the radiographic cassette.

These systems are impractical, particularly in the case of large structures where a considerable number of radiographies are carried out.

In fact, the prior art solutions, besides involving a considerable waste of time, do not guarantee absolute precision and do not exclude the possibility of confusing one radiography with another or with that of another patient, those relating to different parts of the body of a single patient.

Moreover, the application of the lead letters can damage the seriograph of the remotely controlled table.

SUMMARY OF THE INVENTION

The invention provides equipment to print the patient and examination data on a radiographic film provided, with a computerized data input system which enables all data relevant to the radiography to be pre-set, to be stored in a computer and to be retrieved when required, i.e., when the radiography is being performed.

To be able to exploit this automation, it is necessary to have a device which allows the stored data to be printed on the plate at the correct moment. Applicant has realized such a devices, which can be used in any type of computerized equipment for printing data on radiographic film, which acts on the window usually provided on radiographic cassettes, causing it to open and close automatically, to permit printing of the necessary data on the film at times different from the time of execution of the radiography.

These and other results are obtained, according to the present invention, by a device, equipped with a motor, that operates automatically whenever a radiographic cassette is inserted in the equipment, or manually after the insertion of the cassette, and equipped with a cap element, axially movable, for engagement and disengagement with the window of the radiographic cassette and horizontally to open and close the same window.

It is a specific object of the present invention to provide a device for the automatic opening of the window of a radiographic cassette including a fixed bracket, movable equipment sliding along this bracket between a position in which it is engaged with the window and a position of full opening of the same, includes a cap element, sliding vertically between a position of engagement with the window and a position of disengagement of the window itself, and elastic counteracting means that are compressed when the cap element is in its disengagement position, at least one movable slide, sliding on the fixed bracket, whose movement trails the movement the cap element, means for vertically displacing the cap element, and motorized means operatively connected with the movable equipment.

In a preferred embodiment of the device according to the invention, the movable equipment includes a first movable slide, on which the means for the vertical transfer of the cap element are mounted, connected with the motorized means, and a second movable slide, mounted on the supporting bracket, below the first movable slide, the latter sliding on the second movable slide, the cap element passing through both the first and the second movable slides.

Preferably, the means for the vertical displacement of the cap element consist of a wedge carried by the first movable slide and acting on a pair of rollers supported by such cap element.

The device according to the invention is preferably provided with top and bottom limit switches and with a diaphragm element, carried by the movable equipment, that reverses the motion or disconnects the device by darkening the light on the limit switches.

According to the invention, the motion from the motorized means to the movable equipment is transmitted by a lead nut connected by means of a bracket to the movable equipment, sliding on an endless screw driven by the motorized means through a pair of gears.

BRIEF DESCRIPTION OF THE DRAWINGS

The invention will now be described with reference to the accompanying drawings, wherein:

FIG. 1 is a first front elevation view of a device according to the invention;

FIG. 2 is a section view taken along line II—II of FIG. 1;

FIG. 3 is a second front elevation view of a device according to the invention;

FIG. 4 is a section view taken along Line IV—IV of FIG. 3;

DESCRIPTION OF PREFERRED EMBODIMENT

Figure 5:
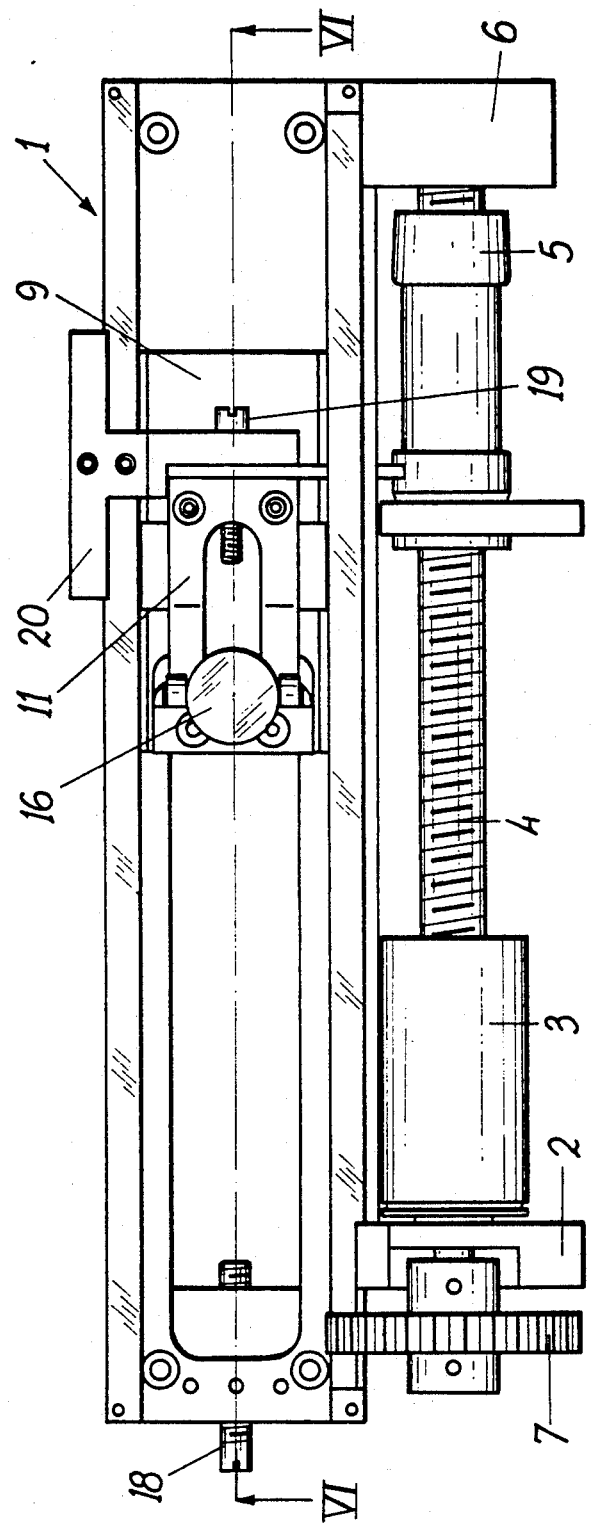
FIG. 5 is a third front elevation view of a device according to the invention.

FIGS. 1 and 2 show the starting position of a device according to the invention.

This device includes a bracket 1 supporting movable equipment, to be described hereinafter, a support 2 for a motor 3, an endless screw 4 on which a lead nut element 5 slides and transmits the motion to the movable equipment, and a support 6 for the endless screw 4.

The motion from motor 3 to endless screw 4 is transmitted by the toothed gear pair 7.

The movable equipment, generally indicated by reference numeral 8, includes a top slide 9, sliding on a bottom slide 10, in turn sliding on supporting bracket 1. The top slide 9 is provided with a wedge 11 that lifts a cap 12 by means of a pair of rollers 13. In front of wedge 11, top slide 9 is provided with a front ledge 14, while cap 12 is provided with a counteracting spring 15 inside a cylinder 16, that makes it free, and by displacing it downwards when wedge 11 is being displaced.

The motion of the lead nut 5 to movable equipment 8 is transmitted through bracket 17.

On supporting bracket 1 a screw 18 is provided, where the movable equipment 8 strikes, that acts on bottom slide 10, while the movable equipment 8 strikes on a ledge 19 for the top dead center of cap 12.

Furthermore, a diaphragm 20 is provided which, by dimming a photoelectric cell (not shown) reverses the motion of motor 3 and switches the device at the end of the cycle.

As already stated, the device according to the invention can be used in any equipment for the execution of radiography equipped with the system to print on the film through a lens.

The device operates as follows: When the cassette is being inserted in the slot of the equipment of the above-mentioned type, a microprocessor, also associated with the equipment, controls motor 3 of the device of the invention. Motor 3 receives an impulse to start. The cassette window is usually equipped, according to standard production methods, with a notch that, when the cassette is being inserted, reaches a position in alignment with cap 12 which is lifted, as shown in FIG. 2, with spring 15 compressed, by the lifting wedge 11.

When motor 3 starts, turning the endless screw 4, the lead nut element 5 advances along the endless screw 4, causing top slide 9 also to advance. This causes wedge 11 to slide under the rollers 13, permitting cap 12 to protrude towards the notch in the cassette window, pushed by spring 15, which can now become decompressed.

When the position shown in FIGS. 3 and 4 is reached, top slide 9 only has moved along bracket 1, as cap 12 is still in the same position with respect to bracket 1, engaged in the slot of the radiographic cassette window.

Figure 6:
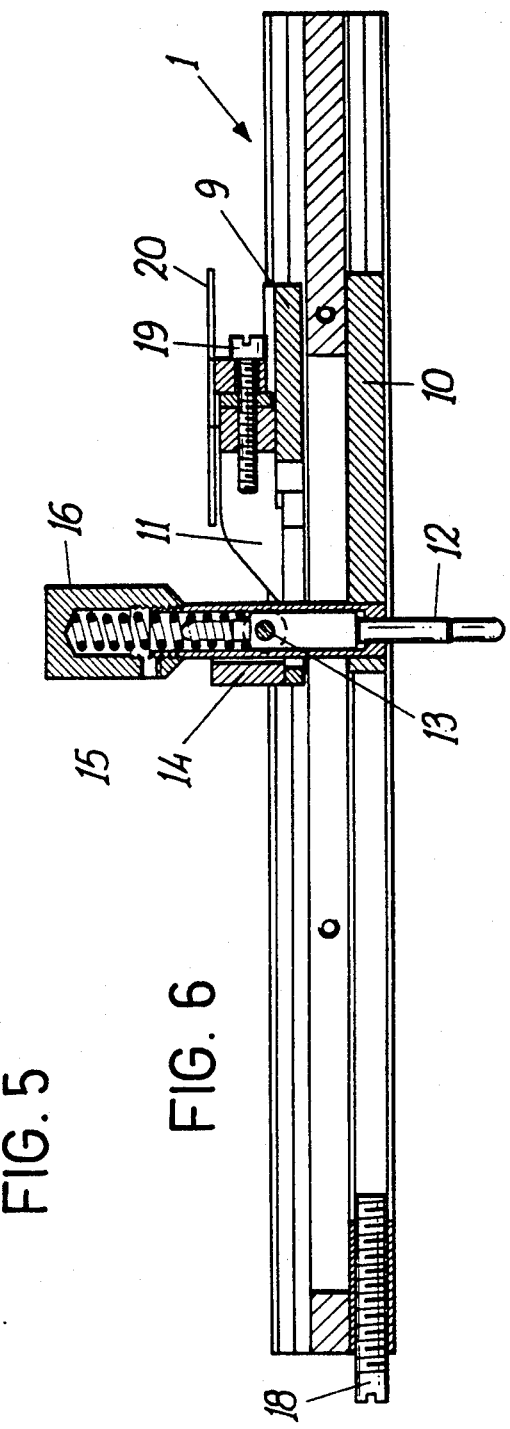
FIG. 6 is a section view taken along line VI—VI of FIG. 5.

When the lead nut 5 continues to advance, ledge 14 of slide 9 engages with cylinder 16 of cap 12 trailing the latter together with the bottom slide 10 to the position shown in FIGS. 5 and 6, which show the top dead center of the stroke of the device according to the invention.

Motor 3 reverses its rotation thanks to the impulse sent by diaphragm 20 which, by dimming a photoelectric cell, sends a signal to the microprocessor, and therefore the entire movable equipment returns to the end of the stroke, disconnecting cap 12 from the notch in the cassette window. The second photoelectric cell is dimmed by diaphragm 20 and switches the device off.

As already stated, the cassette can be developed later, with no risk of confusion, since the name of the patient has been printed on the film.

I claim:

1. In a radiographic cassette having a window, an automatic opening device comprising:
   (a) a fixed bracket;
   (b) equipment adapted for sliding movement along said bracket between a position of engagement with said window and a position of full opening of said window, and motor means operatively connected to said equipment for effecting said sliding movement;
   (c) said equipment including vertical displacement means causing vertical sliding of a cap element between a position of engagement with said window and a position of disengagement with said window, and comprising elastic means counteracting vertical displacement of said cap element, said elastic means being compressed in said position of disengagement, at least one movable slide, sliding on said fixed bracket and trailing in its movement said cap element;
   (d) said equipment including a first movable slide, on which said vertical displacement means are connected with said motorized means, and a second movable slide mounted below said one movable slide that in turn slides on said second movable slide, said cap element extending vertically through both said first and second movable slides; and
   (e) said vertical displacement means consisting of a wedge carried by said first movable slide acting on a plurality of rollers displaced laterally of said cap element.

2. Device according to claim 1, comprising top and bottom limit switches and a diaphragm element which reverses the motion or disconnects said device by dimming said limit switches.

3. Device according to claim 1, wherein motion from said motorized means to said movable equipment is transmitted by means of a lead nut connected through a bracket to said movable equipment and sliding along an endless screw, the motion from said motorized means being transmitted to said endless screw through a pair of gears.

* * * * *